(12) United States Patent
Greive et al.

(10) Patent No.: US 11,147,238 B2
(45) Date of Patent: *Oct. 19, 2021

(54) CIRCULAR GRAZING SYSTEM AND METHOD

(71) Applicant: Pasturebird, Inc., Murrieta, CA (US)

(72) Inventors: Raymond Paul Greive, Murrieta, CA (US); Jeffrey Lane McDaniel, Murrieta, CA (US); Mitchell Robert Combs, Temecula, CA (US); Cory Michael Combs, Temecula, CA (US)

(73) Assignee: Perdue Farms, Inc., Salisbury, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/653,935

(22) Filed: Oct. 15, 2019

(65) Prior Publication Data
US 2020/0113151 A1    Apr. 16, 2020

Related U.S. Application Data

(63) Continuation of application No. 16/262,788, filed on Jan. 30, 2019, now Pat. No. 10,477,834, which is a
(Continued)

(51) Int. Cl.
*A01K 3/00* (2006.01)
*A01K 1/00* (2006.01)
(Continued)

(52) U.S. Cl.
CPC .............. *A01K 3/00* (2013.01); *A01G 25/092* (2013.01); *A01K 1/0209* (2013.01); *A01K 1/105* (2013.01);
(Continued)

(58) Field of Classification Search
CPC ........ A01K 3/00; A01K 1/0209; A01K 1/105; A01K 1/123; A01K 5/02; A01K 7/02;
(Continued)

(56) References Cited

U.S. PATENT DOCUMENTS 3,302,616 A    2/1967  Bradshaw
3,633,547 A    1/1972  Stevens
(Continued)

FOREIGN PATENT DOCUMENTS

GB    2519496 A    4/2015

OTHER PUBLICATIONS

International Search Report and Written Opinion in PCT/US20149/015922, dated Apr. 23, 2019.

*Primary Examiner* — Trinh T Nguyen
(74) *Attorney, Agent, or Firm* — Sheppard Mullin Richter & Hampton LLP

(57) ABSTRACT

A circular grazing system for poultry and/or livestock. The circular grazing system including a center pivot structure installed at a field. The center pivot structure may have a center pivot axis. The field may be a poultry and/or livestock grazing field. The circular grazing system for poultry and/or livestock may include an enclosure for containing poultry and/or livestock. The enclosure may extend generally radially from the center pivot structure to a circumference of the field. The enclosure may be rotably coupled to the center pivot structure such that the enclosure rotates around the center pivot axis.

21 Claims, 15 Drawing Sheets

Related U.S. Application Data continuation of application No. 15/885,455, filed on Jan. 31, 2018, now Pat. No. 10,440,935.

(51) Int. Cl.

| | | |
|---|---|---|
| *A01K 5/02* | (2006.01) | |
| *A01K 7/02* | (2006.01) | |
| *A01K 9/00* | (2006.01) | |
| *A01G 25/09* | (2006.01) | |
| *A01K 1/02* | (2006.01) | |
| *A01K 31/22* | (2006.01) | |
| *A01K 1/10* | (2006.01) | |
| *A01K 1/12* | (2006.01) | |
| *G01S 19/21* | (2010.01) | |
| *G01S 19/23* | (2010.01) | |
| *G05D 1/00* | (2006.01) | |
| *G05D 1/02* | (2020.01) | |
| *H04K 3/00* | (2006.01) | |
| *A01J 5/003* | (2006.01) | |

(52) U.S. Cl.
CPC ............... *A01K 1/123* (2013.01); *A01K 5/02* (2013.01); *A01K 7/02* (2013.01); *A01K 9/00* (2013.01); *A01K 31/22* (2013.01); *G01S 19/215* (2013.01); *G01S 19/23* (2013.01); *G05D 1/0061* (2013.01); *G05D 1/0278* (2013.01); *H04K 3/90* (2013.01); *A01J 5/003* (2013.01); *G05D 2201/0213* (2013.01)

(58) Field of Classification Search
CPC .......... A01K 7/025; A01K 9/00; A01K 31/22; A01K 31/18; A01K 3/002; A01K 1/0041; A01K 1/126; A01G 25/092
See application file for complete search history.

(56) References Cited

U.S. PATENT DOCUMENTS

| | | |
|---|---|---|
| 3,921,585 A | 11/1975 | Hall |
| 4,341,181 A | 7/1982 | Fair |
| 4,721,061 A | 1/1988 | McNatt |
| 4,787,603 A | 11/1988 | Norton |
| 4,821,679 A | 4/1989 | Hackert |
| 4,924,813 A | 5/1990 | Bixler |
| 5,572,954 A | 11/1996 | Elkins |
| 6,062,165 A | 5/2000 | Seiling |
| 8,397,669 B2 | 3/2013 | De Villiers |
| 8,534,230 B2 | 9/2013 | Wilson |
| 2005/0120965 A1 | 6/2005 | Van Den Berg |
| 2012/0204797 A1 | 8/2012 | Courtemanche |
| 2014/0158065 A1 | 6/2014 | Axelson |

CIRCULAR GRAZING SYSTEM AND METHOD

CROSS-REFERENCE TO RELATED APPLICATIONS

The present application is a continuation of U.S. patent application Ser. No. 16/262,788, filed Jan. 30, 2019, which is a continuation of U.S. patent application Ser. No. 15/885,445, filed Jan. 31, 2018, the contents of which are incorporated herein in its entirety.

FIELD

The disclosure relates to a circular livestock, dairy, and poultry grazing system and/or method.

BACKGROUND

Conventional livestock, dairy, and poultry production uses stationary facilities. Due to their stationary nature, livestock and poultry in conventional systems often live in dirty litter and/or fecal matter. As such, conventional livestock and poultry require vaccines, antibiotics and/or other drugs to keep animals alive. Stationary livestock and poultry systems also require manure lagoons, bedding, and/or waste disposal/removal which leads to high materials costs, elevated labor costs, and environmental concerns. Furthermore, livestock and poultry that are treated with vaccines, drugs, and antibiotics, and may subsequently lead to negative health effects on humans that consume their meat, milk, and eggs.

Existing methods of pasture raising livestock, dairy, and poultry are expensive for both farmers and consumers and thus are typically limited to small scale production. The amount of land and labor required to manage a large quantity of grazing livestock and poultry has typically prevented pasture raised livestock, dairy, and poultry from being scalable for commercial poultry farmers.

SUMMARY

One aspect of the disclosure relates to a circular grazing system that is configured to facilitate circular grazing of poultry and/or livestock within a grazing field. The system and/or method may include a grazing field having a center pivot structure installed at the field (e.g., in the center or near center of field, etc.). The center pivot structure may have a center pivot axis around which an enclosure containing poultry and/or livestock rotates. The enclosure may extend generally radially from the center pivot structure to a circumference, perimeter, and/or edge of the grazing field. The enclosure may be rotably coupled to the center pivot structure and/or rotate around the center pivot axis to provide fresh pasture to the poultry and/or livestock contained within. For dairy animals, milking stations may rotate around the field and transfer milk radially to a central collection vat(s). Furthermore, a second arm, comprising an industry standard circular field irrigation system, may extend from the center pivot and be rotably coupled thereto. This arm may water the field and/or move back and forth (e.g. clockwise and counterclockwise) at a different rate from the primary animal enclosure, varying as required by environmental conditions.

The present application relates to a system and method of raising livestock and poultry on pasture to eliminate some of the issues typically associated with conventional livestock, dairy, and poultry farming and provide a healthier, cost effective option on a large scale. The circular grazing system and/or method automates the moving of large animal flocks to fresh pasture every day, automates the feeding and watering, and/or provides temperature/climate regulation for the animals. The circular grazing system and/or method described herein also provides advantages over conventional, stationary livestock and poultry housing in that the animals are moved to fresh pasture and bedding daily, eliminating the need for litter disposal, bedding, and vaccines, drugs, or antibiotics and allowing them to graze on pasture, grass, insects, worms, seeds, weeds, and flowers. Some significant problems solved by the circular grazing system and/or method in described herein is the ability to scale pastured poultry and/or livestock production to greater volumes than allowed for by current systems and/or decrease labor requirements for raising poultry and/or other livestock. The circular grazing system and/or method described herein also eliminates the need to remove dead poultry and/or livestock from the grow house every day, and produces much healthier animals with less inputs. The rotation mechanism may increase the precision of movement to fresh pasture and/or reduce the need for personnel and utility vehicles to traverse sensitive pasture to move and service enclosures. Avoiding excessive compaction and localizing impacted soil to that consistently traversed by wheels of the enclosure will aid water retention and reduce nutrient runoff. In some implementations, because feed and water may be stored centrally, the feeding, watering, and moving of birds may be automated.

The circular grazing system may comprise a center pivot structure installed at a field. The center pivot structure may have a center pivot axis around which an enclosure containing poultry and/or other livestock rotates. The field may include a poultry and/or livestock grazing field. In some implementations, a proximal end of the enclosure proximal to the center pivot structure may have narrower width than a distal end of the enclosure distal to the center pivot structure. By way of non-limiting example, the enclosure may be rectangular, pie-shaped, quadrilateral-shaped, parallelogram-shaped, a curved shape, and/or any other shape. The enclosure may be supported from the ground by wheels, rails, skids, and/or other supports. In some implementations, the enclosure may be supported from above by tensioned cables, a cantilever structure, and/or other supports.

The circular grazing system may comprise an enclosure for containing poultry and/or livestock. The enclosure may extend generally radially from the center pivot structure to a perimeter and/or circumference of the field. By way of non-limiting example, the length of the enclosure may correspond to a radius, length, and/or width of the grazing field. The enclosure may be rotably coupled to the center pivot structure such that the enclosure rotates around the center pivot axis.

In some implementations, the enclosure may comprise two side barriers. The two side barriers may include a first side barrier, a second side barrier, and/or other barriers. The first side barrier and/or the second side barrier may extend generally radially from the center pivot structure to the circumference of the field. In some implementations, the enclosure may comprise a third (or 4th or Nth) barrier connecting the two side barriers to form the enclosure and/or part of the enclosure. The enclosure may restrict the poultry and/or other livestock contained in the enclosure to grazing within the enclosure. The top of the enclosure may or may not be at least partially covered. One or more barriers (e.g., outer walls) may consist of chicken wire or a comparable predator-deterring barrier that doesn't prevent fresh air and sunlight from entering. In some implementations, for example, the length and/or one or more portions of the length of the barrier's may include canvas, plastic, and/or another material that rolls up/down for temperature regulation (the deployment of which may be automated). One or more additional barriers may be present within the enclosures to further partition within an individual enclosure to help with proper animal density per rate of rotation around the radius, a consistent pasture/bird ratio and/or proper manure distribution.

The enclosure may be floorless. As such, the poultry and/or livestock contained in the enclosure may be able to graze on a portion of the field. In some implementations, the enclosure may include a chassis with wheels, tracks, skids, and/or rail that facilitates movement of the enclosure around the center pivot axis. By way of example, there may be a clearance between (i) a bottom of at least a portion of at least one of the two side barriers and (ii) the field such that at least a portion of the enclosure may pass over deceased livestock and/or poultry lying in the field. In some implementations, a lower portion of at least one of the two side barriers is resiliently flexible. In some implementations, one or more sides of the barriers may be resiliently flexible. The one or more sides may have two layers with one or more (e.g., multiple) slits along its length in order to conform to the contours of the field and/or close any gaps through which the animals could escape. Unlike factory farms where one of the highest touch labor items is the removal of dead animals, live animals are maintained in the enclosure, but the lower portion passes over dead animals without requiring touch labor. Additionally, an automated touchless pneumatic mechanism may be used to move poultry and/or animals. The pneumatic mechanism may employ optical, thermal, or infrared sensing technology.

By way of example, compressed air may be released in spurts along length of lower back portion of enclosure. This may cause the healthy animals to move with the enclosure, ensuring only the dead and/or very sick poultry and/or animals get passed over by the flexible barrier. An air compressor located at the center pivot access may provide compressed air to be distributed by a lightweight manifold along the base of the enclosure. Compressed air may be released when the enclosure mechanism is moving. Similar effects may also be achieved through directed acoustic energy with sounds that stimulate poultry and/or animal movement away from the origin of the noise. Larger livestock may not require such a mechanism to ensure forward movement to fresh pasture upon enclosure rotation.

The circular grazing system may comprise a feeding system to supplement nutrients available in the pasture. This system may include a stationary centralized feed hopper to avoid the necessity to move such a heavy component. The feeding system may be automated to distribute food from the hopper to areas throughout the enclosure. In some implementations, the circular grazing system may comprise a water supply for both the enclosure and pasture. By way of example, the pasture water supply may comprise an industry-standard arm containing distributed sprinklers. The enclosure water supply may be automated to distribute water within the enclosure. In some implementations, the enclosure water supply may include automated thermostat regulated misters for internal temperature control. In some implementations, the water supply may be provided and/or part of an irrigation system included in and/or peripheral to the circular grazing system.

In some implementations, the circular grazing system may include a motor and/or one or more processors configured by machine-readable instructions to actuate the motor. Actuating said motor may cause the enclosure to rotate around the center pivot axis. The one or more processors may be programmed to actuate the motor and/or cause the enclosure to rotate around the center pivot axis in accordance with a schedule and/or rotation rate. In some implementations, the schedule and/or rotation rate may indicate when the enclosure will rotate around the center pivot axis, a duration and/or multiple durations the enclosure will rotate around the center pivot axis, a speed at which the enclosure will rotate around the center pivot axis, and/or other characteristics of the rotation of the enclosure around the center pivot axis. This schedule may be consistent, or may be adjusted for optimal rotation rates for the lifecycle of the poultry and/or animals and/or seasonal conditions.

In some implementations, the circular grazing system may comprise a fourth barrier. The fourth barrier may extend generally radially from the center pivot structure to the circumference of the field. In some implementations, the fourth barrier may partially form (i) a second enclosure for containing cows, sheep, and/or goats, and/or (ii) a third enclosure for containing pigs. In some implementations, the fourth barrier and the first side barrier of the enclosure may form a second enclosure for containing cows, sheep, goats and/or other grass eating animals. The fourth barrier and the second side barrier of the enclosure may form a third enclosure for containing pigs. By way of non-limiting example, the enclosure for pigs may include a shaded portion due to the sunlight sensitivity of pig skin. In some implementations, wherein the enclosure contains poultry, a configuration order may indicate the order of the enclosure, the second enclosure, and the third enclosure for a mixed use circular grazing system.

By way of non-limiting example, the second enclosure may contain cows, sheep, goats, and/or other grass eating animals in front of the enclosure containing poultry. Continuing the non-limiting example, the enclosure for containing poultry may be in front of a third enclosure for containing pigs. Continuing the non-limiting example, the third enclosure for containing pigs may be behind the enclosure for containing poultry (wherein the front corresponds to the direction in which the enclosure rotates around the center pivot axis).

Dairy livestock may be incorporated similarly to other livestock. In some implementations, a milking system consisting of milking stations connected to a central milk collection vat may be implemented. This system may consist of an arm rotably coupled to the center pivot and extending along the radius of the pasture.

Egg-laying poultry may be incorporated into the system implementing a similar circularly-rotating enclosure with a light-weight roosting structure and an automated system for egg collection. This may include a roosting structure with a slightly angled floor on which eggs automatically roll toward the egg-collecting component of the system.

Elevated walkways affixed to the enclosure and/or dedicated access roads may be incorporated to allow servicing of the enclosures while minimizing traversal and subsequent compaction of pasture land. If the enclosure reaches an access road speed of rotation may increase in order to minimize enclosure time off pasture.

In some implementations, new chicks may be brooded within the enclosure, remaining stationary on supplemental bedding for several days before beginning to move with the enclosure for the rest of their life cycle. This may eliminate the need for secondary brooding facilities. This may allow allows chicks to be raised on the pasture from receipt as a chick, until full maturity. On-pasture-brooding may enable chicks to grow faster and healthier, and/or learn to eat grass earlier. This may eliminate and/or reduce the negative effect of rapid environmental changes on chicken stress levels, growth rate, and/or mortality. The process of moving chickens from the brooder environment to a pasture is labor intensive and/or potentially harmful to the chicks. Brooding chicks within the enclosure may solve one or more of these problems. By way of non-limiting example, the enclosure may have one or more partitions that separate the brooding chicks from the other chickens, poultry, and/or livestock. The one or more partitions may create segments within the enclosure. One or more of the segments of the enclosure may be climate controlled such that brooding chicks may have a different temperature environment than other poultry within the enclosure. The present disclosure may implement the above novel on-pasture brooding method.

The use of a non-contact pneumatic mechanism and/or use of sound devices to induce poultry to move with the enclosure may be implemented. Responsive to the engine turning on to rotate the enclosure, compressed air may be ejected to ensure proper poultry positioning to avoid healthy poultry being unnecessarily ejected from the flexible barrier. In some implementations, the compressed air may be ejected from a perforated airline pipe situated horizontally along the base of the entire enclosure. Compressed air may also be responsive to automated controls deriving from optical, thermal, or infrared sensing technology.

In some implementations, with the enclosures rotating around the center pivot axis, a method for maintaining uniform manure distribution in an enclosure that narrows as it approaches the center of the circle may be incorporated. For example, the pie-shaped enclosure (especially for poultry) may be partitioned into separate units, with the enclosed unit at the narrow tip of pie shape containing the fewest animals, with an increasing number of animals in the following units corresponding to the widening of the pie shape as the enclosure approaches the outer circumference. This may ensure maintenance of a uniform concentration of animals per square foot of pasture and thus a uniform distribution of manure. One or more of these partitions may be raised at the end of the poultry growth cycle and a pneumatic and/or auditory sweep mechanism may direct and concentrate the poultry towards a desired loading point. This may include directing poultry onto an industry-standard loading conveyer belt.

These and other objects, features, and characteristics of the disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise. As used in the specification and in the claims, the distinctions "first", "second", and/or "third" are used for clarity and distinction purposes and do not indicate order unless the context clearly dictates otherwise.

DETAILED DESCRIPTION

Figure 1A:
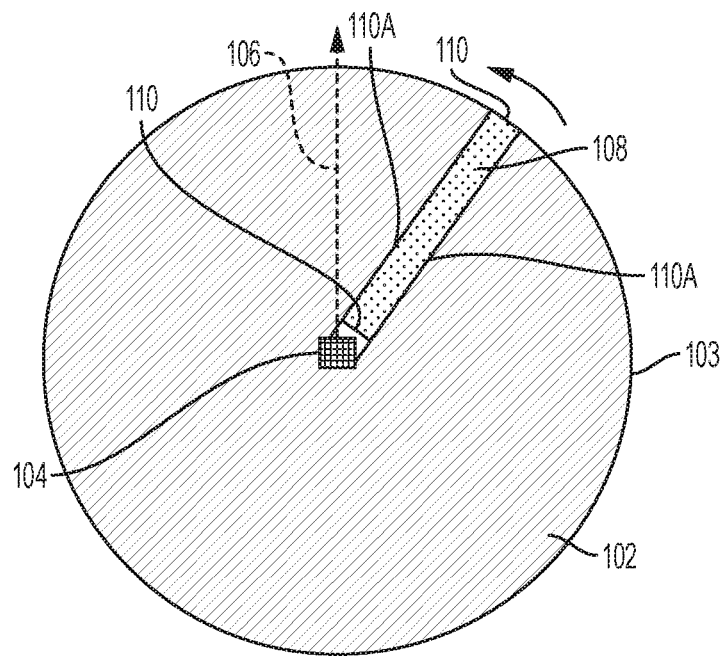
FIG. 1A illustrates a top view of a circular grazing system, in accordance with one or more implementations.
Figure 1B:
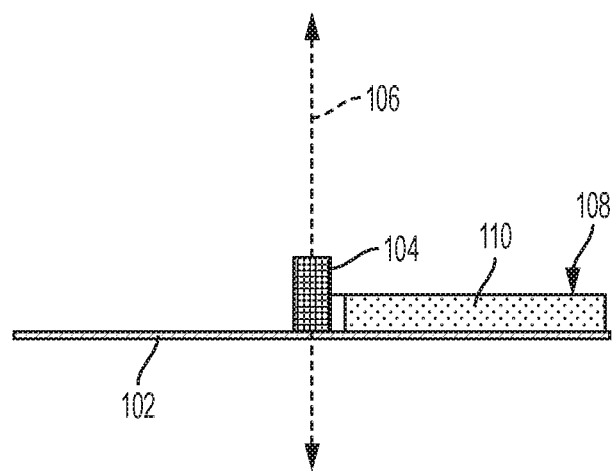
FIG. 1B illustrates a side view of a circular grazing system, in accordance with one or more implementations.

FIGS. 1A and 1B illustrate a circular grazing system 100, in accordance with one or more implementations. FIG. 1A illustrates a top view of circular grazing system, in accordance with one or more implementations. FIG. 1B illustrates a side view of circular grazing system, in accordance with one or more implementations. Circular grazing system 100 may be configured to facilitate circular grazing of poultry and/or livestock within a grazing field 102. In some implementations, grazing field 102 may include a circular grazing field. Grazing field 102 may have a center pivot structure 104 installed at the field (e.g., in the center or near center of field 102, etc.). Center pivot structure 104 may have a center pivot axis 106. Circular grazing system 100 may include enclosure 108 for containing poultry and/or livestock. Enclosure 108 may extend generally radially from center pivot structure 104 toward a circumference 103 and/or perimeter of field 102. Enclosure 108 may be rotably coupled to center pivot structure 104. Enclosure 108 may rotate around center pivot axis 106 to provide the poultry and/or livestock within enclosure 108 with fresh pasture for grazing. Enclosure 108 may rotate around center pivot axis 106 slowly and/or periodically such that one full rotation of enclosure 108 around center pivot axis 106 takes between 2 and 365 days a year (e.g., 90 days).

Field 102 may include a grazing field on which poultry and/or other livestock graze. Field 102 may include grass, insects, worms, seeds, weeds, flowers, and/or other plant material and/or items the poultry and/or other livestock may eat. In some implementations, field 102 may include a circular grazing field, a rectangular grazing field, a square grazing field, and/or another shaped grazing field. Circular grazing fields may be an efficient shape for movable poultry and/or livestock enclosures (e.g., a poultry coop and/or other livestock enclosures) because the circular shape reduces wasted space between fields, reduces the structures required for moving the movable enclosures (e.g., one center structure per field), and/or utilizes a fixed point that contains feed, water, and power that does not need to move. Multiple circular and/or rectangular grazing fields may be included in a scalable configuration of the claimed system and/or method.

Center pivot structure 104 may include a structure installed at field 102. Center pivot structure 104 may include a rotating portion and/or a stationary portion. The rotating portion of center pivot structure 104 may be coupled to enclosure 108 and/or a chassis portion of enclosure 108 and/or center pivot structure 104. The stationary portion of center pivot structure 104 may be installed at field 102. In some implementations, center pivot structure 104 may be installed via a cement pad at the center of field 102. In some implementations, previously existing center pivot irrigation systems may be modified to include an enclosure 108 that rotates around the center pivot (e.g., center pivot structure 104) to facilitate the moving of large poultry flocks and/or other livestock in a circle to fresh pasture regularly (e.g., every day, every few days, etc.).

Figure 2A:
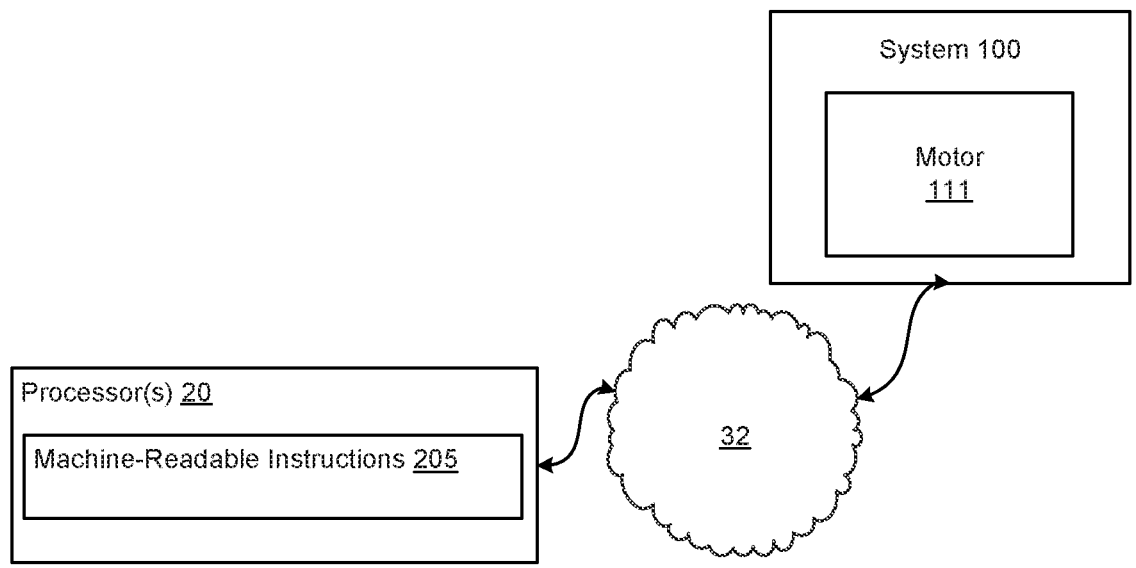
FIG. 2A illustrates one or more processors that are configured to communicate with a circular grazing system, in accordance with one or more implementations.

In some implementations, circular grazing system 100 may include a motor, and/or one or more processors configured by machine-readable instructions to actuate the motor (see e.g., FIG. 2). By way of non-limiting example, center pivot structure 104 may include motor 111, and/or the one or more processors. In some implementations, the one or more processors may be located separately from center pivot structure 104 and/or configured to communicate with motor 111 over a network 32 (see e.g., FIG. 2A).

Figure 2B:
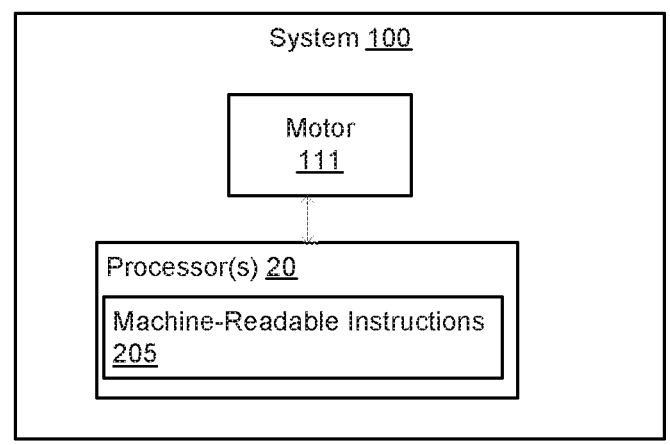
FIG. 2B illustrates a circular grazing system including a motor and one or more processors, in accordance with one or more implementations.

FIG. 2A illustrates one or more processors that communicate with a circular grazing system, in accordance with one or more implementations. FIG. 2B illustrates a circular grazing system including one or more processors, in accordance with one or more implementations. In FIG. 2, processor(s) 20 may be configured by machine-readable instructions 205 to communicate with and/or control motor 111 for circular grazing system 100. The one or more processors 20 may be configured by machine readable instructions 205 to actuate motor 111 causing enclosure 108 to rotate around center pivot axis 106. One or more processors 20 may be configured by machine-readable instructions 205 to actuate motor 111 causing enclosure 108 to rotate around center pivot axis 106 in accordance with a schedule and/or rotation rate. The schedule and/or rotation rate may indicate one or more of: when the enclosure will rotate around the center pivot axis, a duration and/or multiple durations the enclosure will rotate around the center pivot axis, a speed at which the enclosure will rotate around the center pivot axis, and/or other characteristics of the schedule and/or rotation rate at which the enclosure 108 rotates around center pivot axis 106.

In some implementations, enclosure 108 may rotate around center pivot axis 106 according to a ninety-day rotation schedule. One or more processors 20 may be configured by machine-readable instructions 205 to actuate motor 111 and cause enclosure 108 to rotate partially around center pivot axis 106. By way of non-limiting example, enclosure 108 may rotate partially around center pivot axis 106 periodically after a duration of time (e.g., every 15 minutes, every hour, every other hour, and/or after any other duration and/or time period). In some implementations, enclosure 108 may rotate partially around center pivot axis 106 only during the day, during the day and at night, every other day, only on one or more given day(s), on certain days of the week, and/or according to any other schedule. Enclosure 108 may rotate partially around center pivot axis 106 at a user selected speed. By way of non-limiting example, the speed may be slow such that the poultry and/or livestock inside enclosure 108 may not notice enclosure 108 moving and/or may move out of the way. A user may be able to program and/or set the rotation rate, rotation speed, and/or schedule via processors 20. The rotation schedule of enclosure 108 may be consistent, or may be adjusted for optimal rotation rates for the lifecycle of the poultry and/or animals, and/or seasonal conditions.

Processor(s) 20 may be configured to provide information processing capabilities to system 100. As such, processor(s) 20 may include one or more of a digital processor, an analog processor, a digital circuit designed to process information, an analog circuit designed to process information, a state machine, and/or other mechanisms for electronically processing information. Although processor(s) 20 are shown in FIG. 2 as a single entity, this is for illustrative purposes only. In some implementations, processor(s) 20 may include one or more processing units. These processing units may be physically located within the same device, or processor(s) 20 may represent processing functionality of a plurality of devices operating in coordination. The processor 20 may be configured to execute machine-readable instructions via software; hardware; firmware; some combination of software, hardware, and/or firmware; and/or other mechanisms for configuring processing capabilities on processor 20. Processor 20 may include a combination of processors, APIs, third party services, networks, storage, and/or machine-readable instructions.

Returning to FIG. 1, enclosure 108 may include an enclosure for containing poultry and/or livestock. The poultry and/or livestock contained in enclosure 108 may graze within enclosure 108. Enclosure 108 may include one or more barriers 110 (e.g., boundaries, etc.) that enclose (e.g., close in on some and/or all sides) live poultry and/or livestock such that the poultry and/or livestock are restricted to grazing within enclosure 108.

Enclosure 108 may be a floorless enclosure. As such, the live poultry and/or livestock contained in enclosure 108 may be able to graze one or more portions of field 102 defined by one or more barriers 110 of enclosure 108. In some implementations, enclosure 108 may or may not include a roof, roof-like structure, and/or a material covering one or more portions of enclosure 108. By way of non-limiting example, the roof may comprise plastic, aluminum, and/or other materials.

In some implementations, enclosure 108 may comprise at least two side barriers. The two side barriers may include a first side barrier, a second side barrier, and/or other side barriers. The first side barrier and/or the second side barrier may extend generally radially from center pivot structure 104. Generally radially may indicate one or more of the barriers extend, diverge, and/or radiate from center pivot structure 104 towards the circumference 103, perimeter, and/or outer edge(s) of field 102. Barriers that radiate from center pivot structure 104 may include barriers that extend from a central point and/or part (e.g., center pivot structure 104) out into field 102. In some implementations, one or more barriers may extend from another barrier proximal to center pivot structure 104 and/or from center pivot structure 104 towards the circumference 103, perimeter, and/or outer edges of field 102. In some implementations, generally radially may indicate the barriers extend from center pivot structure 104 and/or another barrier towards the circumference 103, perimeter, and/or outer edges of field 102 in a parallel and/or generally parallel manner (e.g., such that the enclosure is generally rectangular). In some implementations, the enclosure may be supported from the center pivot by a series of cables in a similar manner to a cable-stayed bridge. In some implementations, the enclosure may be supported by the one or more barriers mounted on and/or coupled to a chassis rotably coupled to the center pivot structure.

The circular grazing system may comprise a center pivot structure installed at a field. The center pivot structure may have a center pivot axis around which an enclosure containing poultry and/or other livestock rotates. The field may include a poultry and/or livestock grazing field. In some implementations, a proximal end of the enclosure proximal to the center pivot structure may have narrower width than a distal end of the enclosure distal to the center pivot structure. By way of non-limiting example, the enclosure may be rectangular, pie-shaped, quadrilateral-shaped, parallelogram-shaped, a curved shape, and/or any other shape. The enclosure may be supported from the ground by wheels, rails, skids, and/or other supports. In some implementations, the enclosure may be supported from above by tensioned cables, a cantilever structure, and/or other supports.

In some implementations, two or more of the barriers may extend, diverge, and/or radiate from center pivot structure 104 and/or another barrier towards the circumference 103, perimeter, and/or outer edges of field, but may or may not reach and/or extend to the circumference 103, perimeter, and/or outer edges of field 102. Responsive to the two or more barriers 110 not extending to circumference 103, enclosure 108 may include one or more other barriers that reach and/or extend to circumference 103, perimeter, and/or outer edges of field 102.

The at least two side barriers 110A may make up the side boundaries and/or length of enclosure 108. One or more other barriers and or center pivot structure 104 may make up one or more end boundaries and/or width of enclosure 108.

The barriers may comprise any suitable material for containing poultry and/or livestock within enclosure 108 and/or protecting the poultry and/or the livestock within enclosure 108 from one or more predators, weather, or other potential threats. By way of non-limiting example, the barriers may comprise one or more of and/or a combination of: fences, walls, netting, wood, paneling, mesh, wire, cloth, metal sheeting, shingles, tarpaper, windows, canvas, plastic, tarp, rubber, and/or other materials. In some implementations, one or more barriers (e.g., outer walls) may consist of chicken wire or a comparable predator-deterring barrier that doesn't prevent fresh air and sunlight from entering. In some implementations, for example, the length and/or one or more portions of the length of the barriers may include canvas, plastic, and/or another material that rolls up/down for temperature regulation (the deployment of which may automated, including thermostatic regulation). One or more additional barriers may be present within the enclosures to further partition within an individual enclosure to help with proper animal density per rate of rotation around the radius, a consistent pasture/bird ratio and/or proper manure distribution. In some implementations, one or more sides of the barriers may be resiliently flexible. One or more of the barriers may have two layers with one or more (e.g., multiple) slits along its length in order to conform to the contours of the field and/or close any gaps through which the animals could escape.

Enclosure 108 may comprise any shape and/or configuration that covers and/or encloses a portion of field 102 as it rotates around center pivot axis 106. In some implementations, wherein field 102 is a circular field, the length of enclosure 108 may generally correspond to the radius of field 102. By way of non-limiting example, all and/or most of field 102 (e.g., minus the cement pad and/or portion of field proximate to and/or under center pivot structure 104, and/or a portion of filed around the circumference 103 and/or perimeter of field 102) may be enclosed and/or covered by enclosure 108 for at least a duration of time during one full rotation of enclosure 108 around center pivot axis 106.

Figure 3:
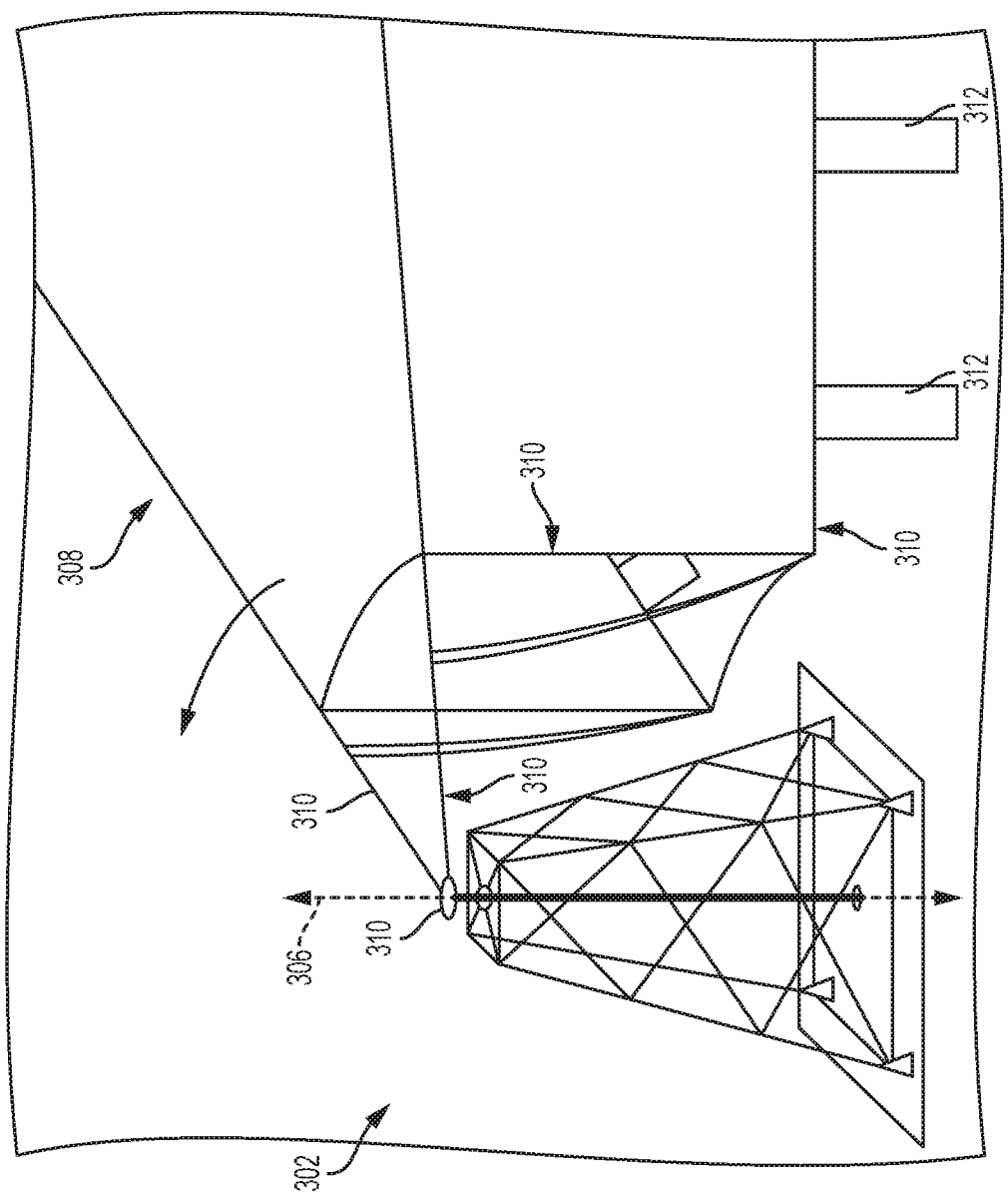
FIG. 3 illustrates an enclosure including a chassis with wheels, in accordance with one or more implementations.

In some implementations, enclosure 108 may include a chassis with wheels, tracks, skids, rail, floats on a channel of water, and/or any moving device that facilitates movement of the enclosure around the center pivot axis. FIG. 3 illustrates an enclosure including a chassis with wheels, in accordance with one or more implementations. Enclosure 308 may include chassis 310 with one or more wheels 312. Chassis 310 and/or one or more wheels 312 may facilitate movement of enclosure 308 around center pivot axis 306 within field 302. In some implementations, chassis 310 may include and/or be a part of center pivot structure such that chassis 310 is a center pivot chassis.

Returning to FIG. 1, in some implementations, there may be a clearance between (i) a bottom of at least a portion of at least one of the two side barriers 110A and (ii) field 102. As such, at least a portion of enclosure 108 may pass over deceased livestock and/or poultry lying in field 102. In some implementations, a lower portion of at least one of the two side barriers 110A of enclosure 108 may be resiliently flexible. The resiliently flexible portion may pass over deceased and/or sick animals, and/or keep permanent contact with the ground/field as the unit moves so the birds do not escape. As such, live animals may be maintained in enclosure 108, but the lower portion may pass over dead animals. By way of non-limiting example, the lower portion may include one or more flaps. The one or more flaps may maintain live animals in enclosure 108 by creating a portion of at least one of the barriers, while flexibly passing over stationary dead animals lying on field 102 when enclosure 108 moves or rotates.

The use of a non-contact pneumatic mechanism and/or use of sound devices to induce poultry to move with the enclosure may be implemented. In some implementations, the circular grazing system may comprise a pressurized perforated airline pipe and/or one or more sound devices. The perforated airline pipe and/or one or more sound devices may be coupled to the enclosure and/or oriented in the direction of the movement of the enclosure. The perforated airline pipe may run along the length of the enclosure on a lower portion of the back barrier of the enclosure. This may encourage poultry and/or livestock to move in the correct direction and/or to prevent live poultry and/or livestock from being ejected under the back lower barrier as the enclosure rotates. In some implementations, the pressurized perforated airline pipe may release compressed air from airline perforations in the pressurized perforated airline pipe. In some implementations, the one or more sound devices are automated to induce poultry and/or livestock movement responsive to the enclosure rotating around the center pivot axis.

Responsive to the engine turning on to rotate the enclosure, the compressed air may be ejected to ensure proper poultry positioning to avoid healthy poultry being unnecessarily ejected from the flexible barrier. In some implementations, an automated touchless pneumatic mechanism and/or acoustic stimulation may be used to move poultry and/or animals. Compressed air may be used to encourage poultry and/or livestock movement in the correct direction responsive to automated controls deriving from optical, thermal, or infrared sensing technology. By way of non-limiting example, thermal sensing technology may be used to sense which birds are already deceased. By way of example, compressed air may be released in spurts along the length of lower back portion of enclosure. This may cause the healthy animals to move with the enclosure, ensuring only the dead and/or very sick poultry and/or animals get passed over by the lower portion of at least one of the two side barriers 110A. By way of non-limiting example, an air compressor located at center pivot structure 104 may provide compressed air to be distributed by a lightweight manifold along the lower portion of at least one of the two side barriers 110A. Compressed air may be released when the enclosure mechanism is moving. Similar effects may also be achieved through directed acoustic energy with sounds that stimulate poultry and/or animal movement away from the origin of the noise. Larger livestock may not require such a mechanism to ensure forward movement to fresh pasture upon enclosure rotation.

Dairy livestock may be incorporated similarly to other livestock. In some implementations, a milking system consisting of milking stations connected to a central milk collection vat may be implemented. This system may consist of an arm rotably coupled to the center pivot and extending along the radius of the pasture.

Egg-laying poultry may be incorporated into the system implementing a similar circularly-rotating enclosure with a light-weight roosting structure and an automated system for egg collection. This may include a roosting structure with a slightly angled floor on which eggs automatically roll toward the egg-collecting component of the system.

Elevated walkways affixed to the enclosure and/or dedicated access roads may be incorporated to allow servicing of the enclosures while minimizing traversal and subsequent compaction of pasture land. If the enclosure reaches an access road speed of rotation may increase in order to minimize enclosure time off pasture.

In some implementations, with the enclosures rotating around the center pivot axis, a method for maintaining uniform manure distribution in an enclosure that narrows as it approaches the center of the circle may be incorporated. For example, the pie-shaped enclosure (especially for poultry) may be partitioned into separate units, with the enclosed unit at the narrow tip of pie shape containing the fewest animals, with an increasing number of animals in the following units corresponding to the widening of the pie shape as the enclosure approaches the outer circumference. This may ensure maintenance of a uniform concentration of animals per square foot of pasture and thus a uniform distribution of manure. One or more of these partitions may be raised at the end of the poultry growth cycle and a pneumatic and/or auditory sweep mechanism may direct and concentrate the poultry towards a desired loading point. This may include directing poultry onto an industry-standard loading conveyer belt.

Figure 4:
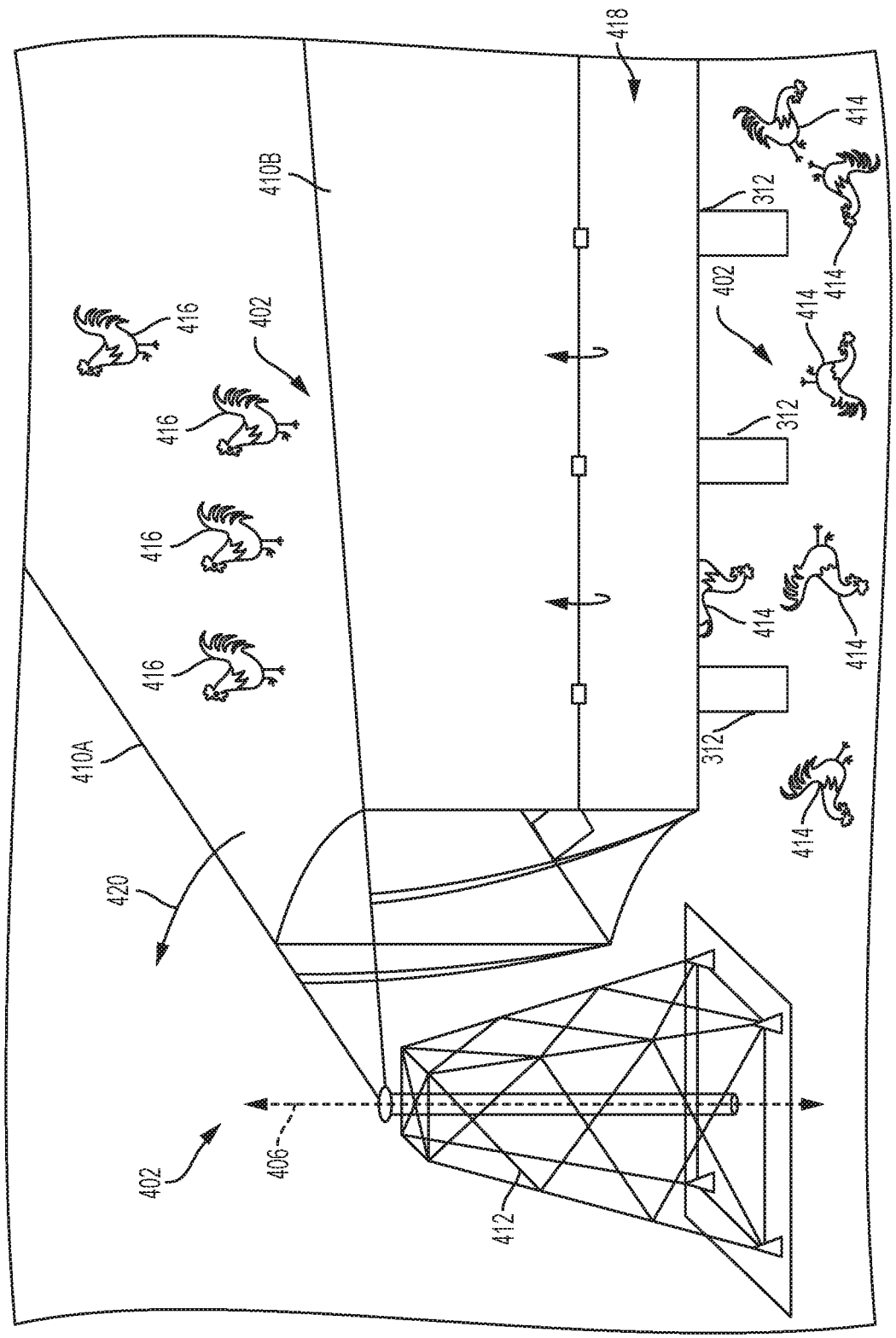
FIG. 4 illustrates an example enclosure including a lower portion of at least one of the two side barriers that is resiliently flexible, in accordance with one or more implementations.

FIG. 4 illustrates an example enclosure including a lower portion of at least one of the two side barriers that is resiliently flexible, in accordance with one or more implementations. Enclosure 408 may include two or more barriers 410. A lower portion 418 of barrier 410B may be resiliently flexible (e.g., comprise a movable flap, a rubber flap, and/or otherwise be resiliently flexible). Lower portion 418 may maintain live animals 416 inside enclosure 408 while passing over deceased animals 414 in field 402. In some implementations, enclosure 408 may include a roof and/or partial roof (not illustrated such that the live animals 416 on field 402 are visible in FIG. 4). By way of non-limiting example, responsive to enclosure 408 rotating around center pivot axis 406 in the direction of arrow 420, deceased animals 414 may pass under barrier 410B and thereby removed from enclosure 408. As such, a farmer does not have to enter enclosure 408 to remove dead animals. In some implementations, lower portion 418 may include one or more flaps. By way of non-limiting example, the one or more flaps may be hingidly coupled to at least one of the two side barriers 410. While not passing over deceased animals 414, the clearance between lower portion 418 and field 402 may be such that it does not enable live animals 416 to escape.

Figure 5:
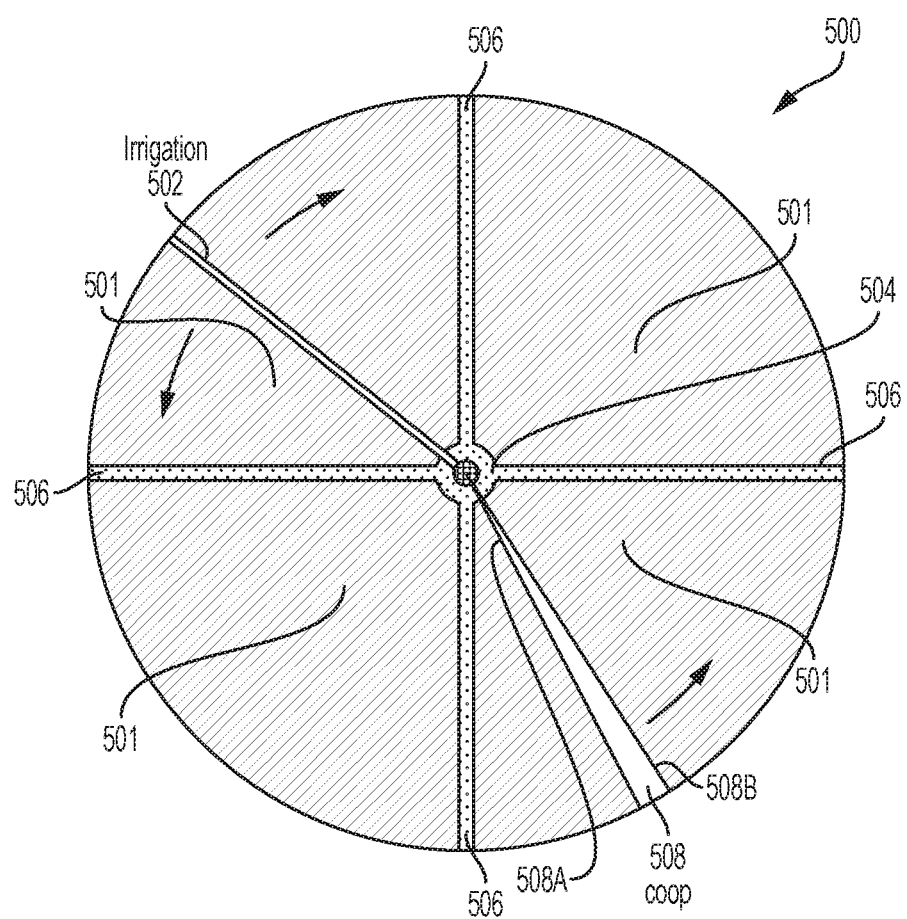
FIG. 5 illustrates an example circular grazing system, in accordance with one or more implementations.

FIG. 5 illustrates an example circular grazing system, in accordance with one or more implementations. In some implementations, circular grazing system 500 may include an irrigation system 502. Irrigation system 502 may be configured to rotate around center pivot axis 504 in one or both directions. In some implementations, circular grazing system 500 may include one or more access roads 506. The one or more access roads 506 may be used to deliver baby poultry (e.g., chicks, etc.) and/or other baby livestock to enclosure 508, deliver feed, and/or to pick up grown poultry (e.g., chickens) and/or livestock. Irrigation system 502 may be configured to water field 501. In some implementations, irrigation system 502 may be configured to deliver water to the poultry and or livestock contained in enclosure 508, and/or other poultry and/or livestock in field 501.

Circular grazing system 500 may comprise center pivot structure 504 installed at field 501. Circular grazing system 500 may include enclosure 508 containing poultry and/or other livestock that rotates around center pivot structure 504 covering portions of field 501. Field 501 may include a poultry and/or livestock grazing field. In some implementations, a proximal end 508A of enclosure 508 proximal to the center pivot structure 504 may have narrower width than a distal end 508B of the enclosure 508 distal to center pivot structure 504. By way of non-limiting example, enclosure 508 may be rectangular, pie-shaped (e.g., as illustrated in FIG. 5), quadrilateral-shaped, parallelogram-shaped, a curved shape, and/or any other shape. Enclosure 508 may be supported from the ground by wheels, rails, skids, and/or other supports. In some implementations, the enclosure may be supported from above by tensioned cables, a cantilever structure, and/or other supports.

Figure 6A:
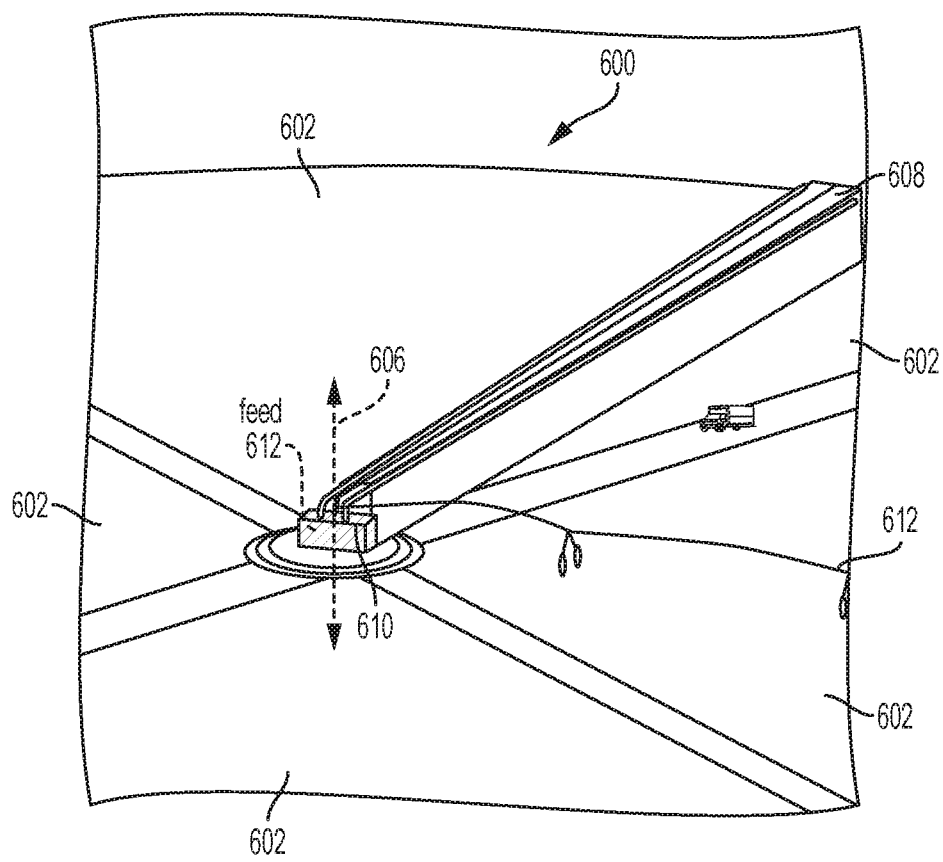
FIG. 6A illustrates an example circular grazing system, in accordance with one or more implementations.

FIG. 6A illustrates an example circular grazing system, in accordance with one or more implementations. Circular grazing system 600 may include enclosure 608 extending generally radially from center pivot structure 604. Enclosure 608 may be configured to rotate around center pivot axis 606. Circular grazing system 600 may include feeding system 610. Feeding system 610 may be automated. Feeding system 610 may distribute food within enclosure 608. Feeding system 610 may include a feed bin, an auger bit, and/or other components for automatically deploying feed within enclosure 608. Feeding system 610 may include a rotating feed bin that can move around the circle in conjunction with enclosure 608. In some implementations, feeding system 610 may include a stationary centralized feed hopper or underground feed storage unit (e.g., to avoid the necessity to move such a heavy component). In some implementations, circular grazing system 600 may include water supply. Water supply may be automated and/or distribute water within enclosure 608, and/or onto field 602. In some implementations, a second arm 612 (e.g., comprising an industry standard circular field irrigation system) may extend from center pivot structure 604 and be rotably coupled to center pivot structure 604. Second arm 612 may water the field and/or move back and/or forth (e.g. clockwise and counter-clockwise) at a different rate from enclosure 608, varying as required by environmental conditions. By way of example, the water supply may comprise an industry-standard arm containing distributed sprinklers. The water supply for enclosure 608 may be automated to distribute water within the enclosure. In some implementations, the water supply for enclosure 608 may include automated thermostat regulated misters for internal temperature control. In some implementations, for dairy animals, milking stations may rotate around the field and transfer milk radially to a central collection vat(s).

Figure 6B:
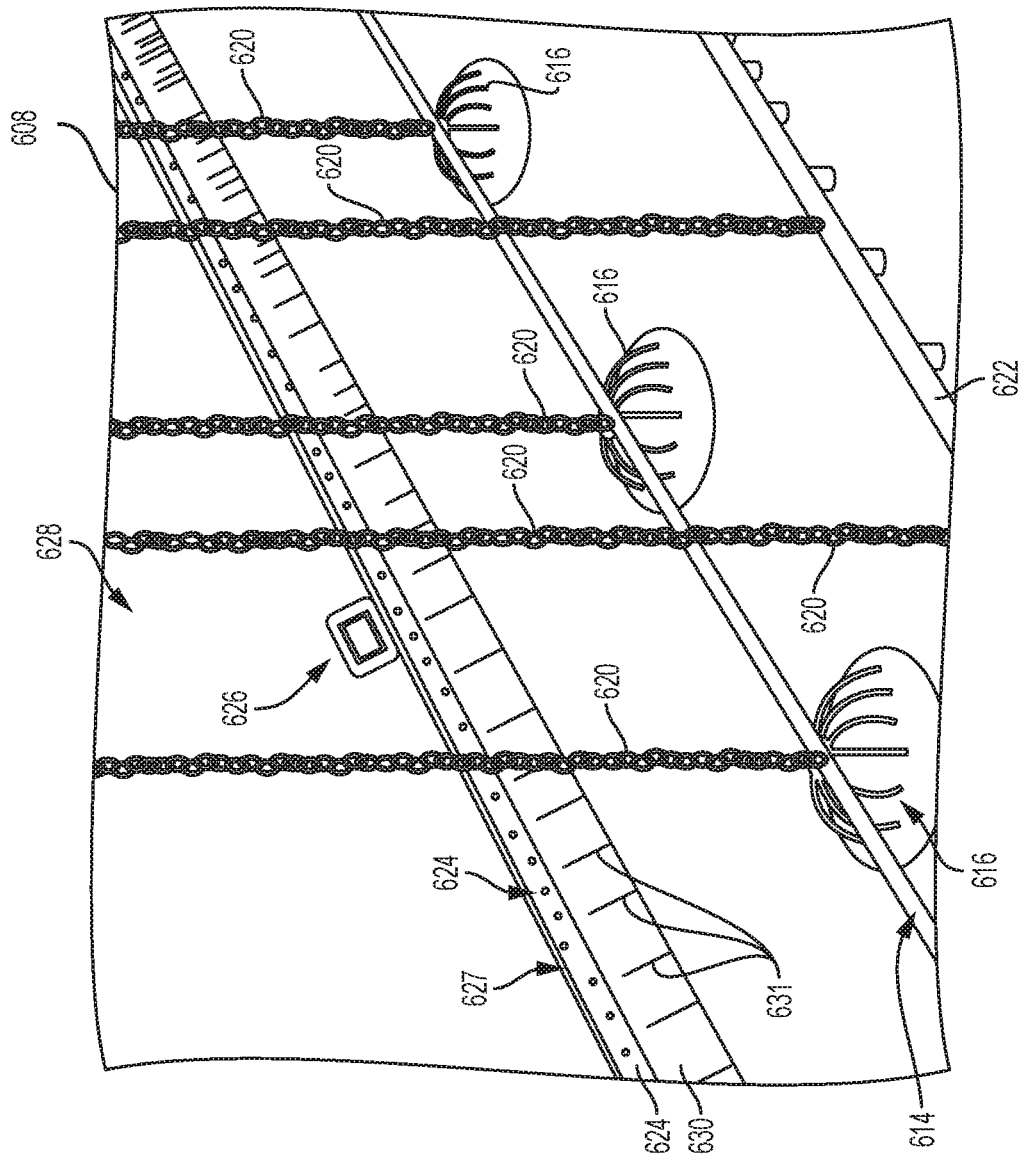
FIG. 6B illustrates an example interior of an enclosure of a circular grazing system, in accordance with one or more implementations.

FIG. 6B illustrates an example interior of an enclosure of the circular grazing system, in accordance with one or more implementations. In some implementations, FIG. 6B may represent an example interior of enclosure 608. Enclosure 608 may include one or more side wall(s) 628. Side wall(s) 628 may comprise a material (e.g., canvas, fabric, etc.) that may be rolled up and/or down for temperature control and/or weather protection. Side wall(s) 628 may make up one or more portions of one or more side barriers of enclosure 608. Enclosure 608 may include one or more structural member(s) 627. Structural member(s) 626 may be part of and/or coupled to a chassis that facilitates movement of enclosure 608 around center pivot axis 606. Enclosure 608 may include a perforated compressed airline pipe 624 that releases compressed air from airline perforations. The compressed air may be released via perforated compressed airline pipe 624 to move poultry and/or animals within enclosure 608 (e.g., such that enclosure 608 does not pass over healthy birds as it rotates). By way of non-limiting example, compressed air may be released in the direction of travel of enclosure 608 when enclosure 608 is moving. Enclosure 608 may include an acoustic device 626. Acoustic device 626 may stimulate poultry and/or animal movement away from the origin of the noise. By way of non-limiting example, acoustic device 626 may stimulate poultry and/or animal movement away from the origin of the noise when enclosure 608 is moving (e.g., in the direction of travel of enclosure 608).

Enclosure 608 may include a resiliently flexible lower portion 630 of at least one of the one or more side barriers. Resiliently flexible lower portion 630 may include one or more slits 631 to help fill in contours in the pasture, and/or pass over obstacles (e.g., deceased animals, rocks, uneven pastures, etc.). In some implementations, enclosure 608 may include multiple resiliently flexible lower portions 630. Enclosure 608 may include one or more poultry feeders 616 and/or an auger tube 614 for automated feeding. In some implementations, auger tube 614 may be connected to a central feed storage unit (e.g., an underground feed storage unit). Enclosure 308 may include a water supply. The water supply may include water line 622. By way of non-limiting example, water line 622 may comprise a poultry water nipple line that provides drinking water to the birds and/or animals. Chains 620 may facilitated placement of auger tube 614, water line 622, poultry feeders 616, and/or other structures and/or items within enclosure 608.

Figure 7A:
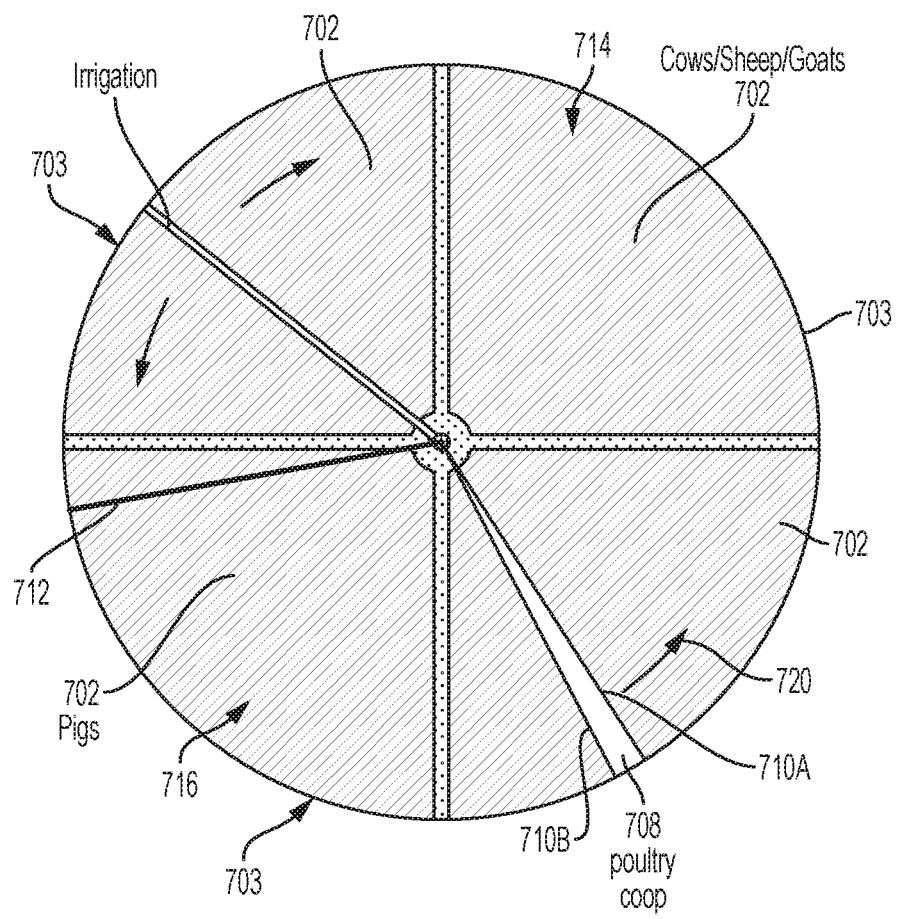
FIG. 7A illustrates a circular grazing system, in accordance with one or more implementations.

FIG. 7A illustrates a circular grazing system, in accordance with one or more implementations. Circular grazing system 700 may include a center pivot structure installed at field 702. Circular grazing system 700 may include an enclosure 708 for containing poultry. Enclosure 708 may extend generally radially from the center pivot structure to a circumference of field 702. Enclosure 708 may be rotably coupled to the center pivot structure such that enclosure 708 rotates around the center pivot axis (e.g., in the direction of arrow 720). Enclosure 708 may include first side barrier 710A and/or second side barrier 710B.

In some implementations, circular grazing system 700 may comprise a mix use circular grazing system. Circular grazing system 700 may comprise a fourth barrier 712 extending generally radially from the center pivot structure toward circumference 709 of field 702. Circular grazing system 700 may comprise a fourth barrier 712 extending radially from the center pivot structure toward circumference 703 and/or the perimeter of field 702.

In some implementations, fourth barrier 712 and first side barrier 710A may at least partially form second enclosure 714. By way of example, second enclosure 714 may be partially formed by another barrier near the circumference 703 and/or the perimeter of field 702 connecting fourth barrier 712 and first side barrier 710A. In some implementations, the other barrier may include a stationary perimeter barrier at and/or near the circumference 703 and/or the perimeter of field 702 (e.g., such that the side barriers of second enclosure 714 rotate, but stationary perimeter does not). Second enclosure 714 may be configured to contain grass eating animals. By way of non-limiting example, second enclosure 714 may contain one or more cows, sheep, goats, and/or other livestock. In some implementations, second enclosure 714 may be in front of enclosure 708 containing poultry (e.g., wherein the front is relative to and corresponds with the direction in which the enclosures are rotated around the center pivot axis).

In some implementations, fourth barrier 712 and second side barrier 710B may at least partially form third enclosure 716. By way of example, third enclosure 716 may be partially formed by another barrier near the circumference 703 and/or the perimeter of field 702 connecting fourth barrier 712 and second side barrier 710B. In some implementations, the other barrier may include a stationary perimeter barrier at and/or near the circumference 703 and/or the perimeter of field 702 (e.g., such that the side barriers of third enclosure 716 rotate, but the stationary perimeter does not). Third enclosure 716 may contain pigs and/or other livestock. In some implementations, third enclosure 716 may be behind enclosure 708 containing poultry (e.g., wherein the front is relative to and corresponds with the direction in which the enclosures are rotated around the center pivot axis). By way of non-limiting example, the pigs may naturally dispose of the dead poultry that pass under enclosure 708, eliminating the need for a farmer to collect the dead poultry.

In some implementations, wherein circular grazing system 700 is a mix use circular grazing system, multiple enclosures may be included in circular grazing system 700. The multiple enclosures may have an order configuration indicating an order in which the types of livestock should graze within field 702. By way of non-limiting example, enclosure 708, second enclosure 714, and/or the third enclosure 716 may have an order configuration. Continuing the non-limiting example, the order configuration may include (i) second enclosure 714 containing cows, sheep, and/or goats in front of enclosure 708 containing poultry, (ii) enclosure 708 containing poultry in front of the third enclosure 716 containing pigs, and/or (iii) and the third enclosure for containing pigs behind enclosure 708 containing poultry, wherein the front corresponds to the direction in which the enclosure rotates around the center pivot axis.

Figure 7B:
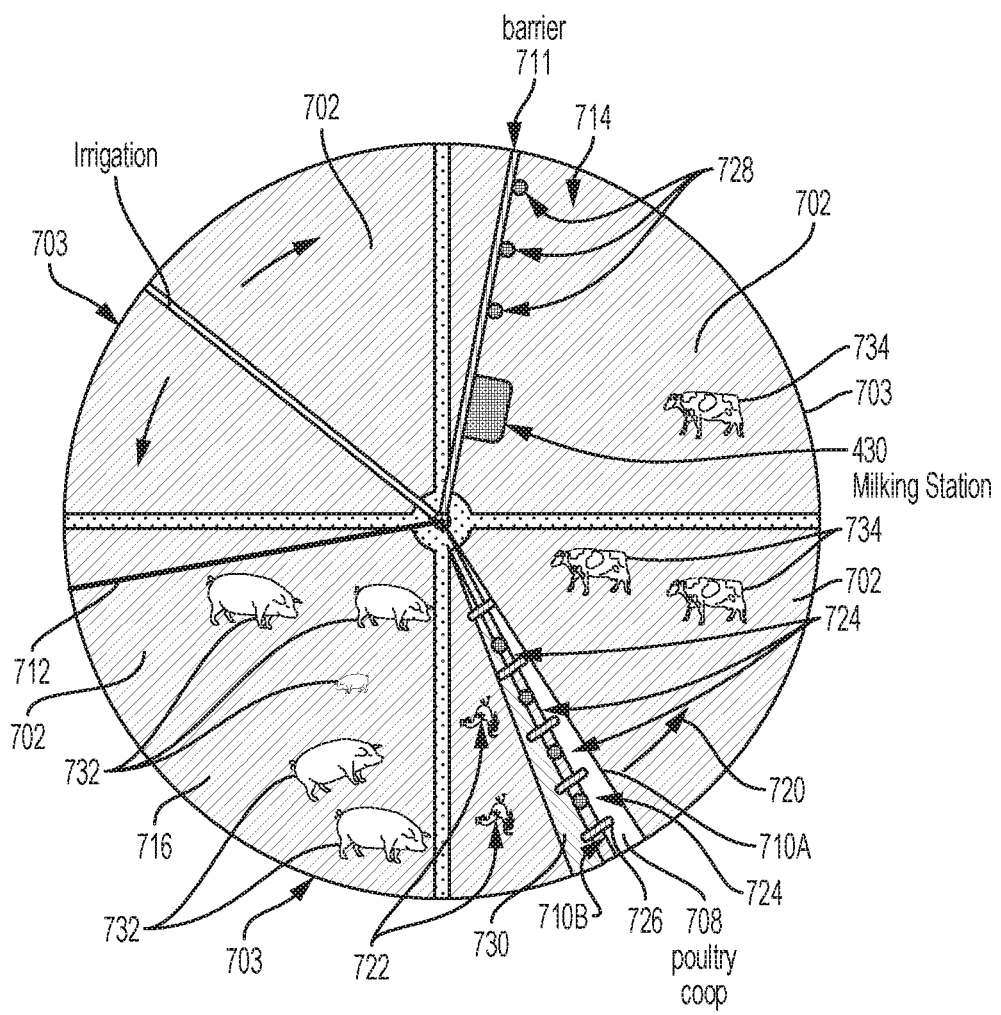
FIG. 7B illustrates a circular grazing system, in accordance with one or more implementations.

FIG. 7B illustrates a circular grazing system, in accordance with one or more implementations. Circular grazing system 700 may include a center pivot structure installed at field 702. Circular grazing system 700 may include an enclosure 708 for containing poultry. Enclosure 708 may extend generally radially from the center pivot structure to a circumference of field 702. Enclosure 708 may be rotably coupled to the center pivot structure such that enclosure 708 rotates around the center pivot axis (e.g., in the direction of arrow 720). Enclosure 708 may include shade component 730. Shade component 730 may include a lightweight shade suspended from an upper back portion and/or other portion of enclosure 708 via one or more structural supports 724. In some implementations, there may be a gap between enclosure 708 and shade component 730 such that the sun is not blocked from entering enclosure 708. Enclosure 708 may include first side barrier 710A and/or second side barrier 710B.

In some implementations, circular grazing system 700 may comprise a mix use circular grazing system. Circular grazing system 700 may comprise a fourth barrier 712 extending generally radially from the center pivot structure toward circumference 709 of field 702. Circular grazing system 700 may comprise a fifth barrier 711 extending radially from the center pivot structure toward circumference 703 and/or the perimeter of field 702.

In some implementations, fifth barrier 711 and first side barrier 710A may at least partially form second enclosure 714. By way of example, second enclosure 714 may be partially formed by another barrier near the circumference 703 and/or the perimeter of field 702 connecting fifth barrier 711 and first side barrier 710A. In some implementations, the other barrier may include a stationary perimeter barrier at and/or near the circumference 703 and/or the perimeter of field 702 (e.g., such that the side barriers of second enclosure 714 rotate, but stationary perimeter does not). Second enclosure 714 may be configured to contain grass eating animals. By way of non-limiting example, second enclosure 714 may contain one or more cows 734, and/or one or more sheep, goats, and/or other livestock. In some implementations, second enclosure 714 may be in front of enclosure 708 containing poultry (e.g., wherein the front is relative to and corresponds with the direction in which the enclosures are rotated around the center pivot axis). One or more water troughs 728 may be coupled to fifth barrier 711. Water troughs 728 may provide cows 734 and/or other grass eating animals with drinking water. Fifth barrier 711 may comprise and/or include a mobile milking station system coupled to and/or as part of fifth barrier 711.

In some implementations, fourth barrier 712 and second side barrier 710B may at least partially form third enclosure 716. By way of example, third enclosure 716 may be partially formed by another barrier near the circumference 703 and/or the perimeter of field 702 connecting fourth barrier 712 and second side barrier 710B. In some implementations, the other barrier may include a stationary perimeter barrier at and/or near the circumference 703 and/or the perimeter of field 702 (e.g., such that the side barriers of third enclosure 716 rotate, but the stationary perimeter does not). Third enclosure 716 may contain pigs 732 and/or other livestock. In some implementations, third enclosure 716 may be behind enclosure 708 containing poultry (e.g., wherein the front is relative to and corresponds with the direction in which the enclosures are rotated around the center pivot axis). By way of non-limiting example, pigs 732 may naturally dispose of dead poultry 722 that pass under enclosure 708, eliminating the need for a farmer to collect dead poultry 722.

Figure 8:
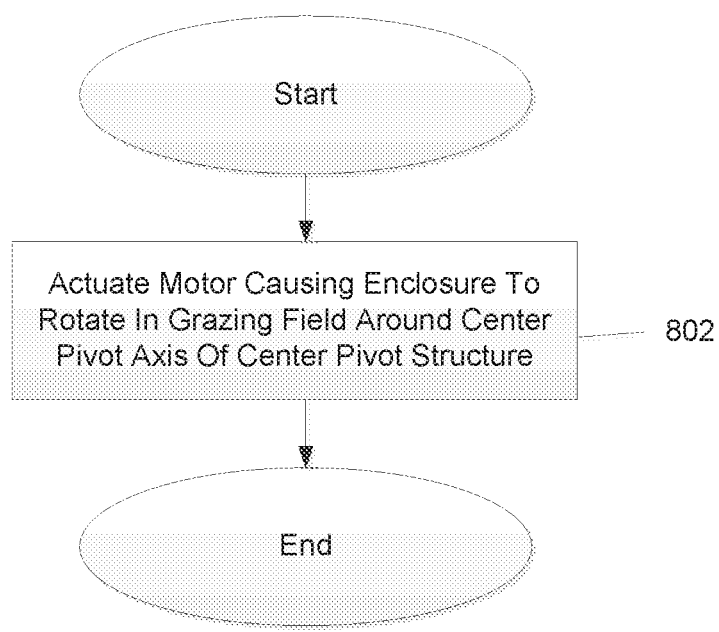
FIG. 8 illustrates an example method for facilitating circular grazing of poultry and/or livestock, in accordance with one or more implementations.

FIG. 8 illustrates an exemplary method 800 for facilitating circular grazing of poultry and/or livestock, in accordance with one or more implementations. Method 800 may be implemented by a circular grazing system including one or more of a center pivot structure, an enclosure, a motor, and/or one or more processors configured by machine-readable instructions. The operations of method 800 presented below are intended to be illustrative and non-limiting examples. In certain implementations, method 800 may be accomplished with one or more additional operations not described, and/or without one or more of the operations discussed. Additionally, the order in which the operations of method 800 are illustrated in FIG. 8 and described below is not intended to be limiting.

In certain implementations, method 800 may be implemented in one or more processing devices (e.g., a digital processor, an analog processor, a digital circuit designed to process information, an analog circuit designed to process information, and/or other mechanisms for electronically processing information). The one or more processing devices may include one or more devices executing some or all of the operations of method 800 in response to instructions stored electronically on an electronic storage medium. The one or more processing devices may include one or more devices configured through hardware, firmware, and/or software to be specifically designed for execution of one or more of the operations of method 800.

Regarding method 800, at an operation 802, a motor may be actuated. Actuating the motor may cause the enclosure to rotate in a grazing field around a center pivot axis of the center pivot structure. The enclosure may contain poultry and/or livestock within the enclosure. As such, actuating the motor and causing the enclosure to rotate in the grazing field may cause the poultry and/or livestock within the enclosure to move in a manner corresponding to a rotation of the enclosure. In some implementations, operation 802 is performed by one or more processors configured by machine-readable instructions the same as or similar to processors 20 (shown in FIG. 1 and described herein).

Figure 9:
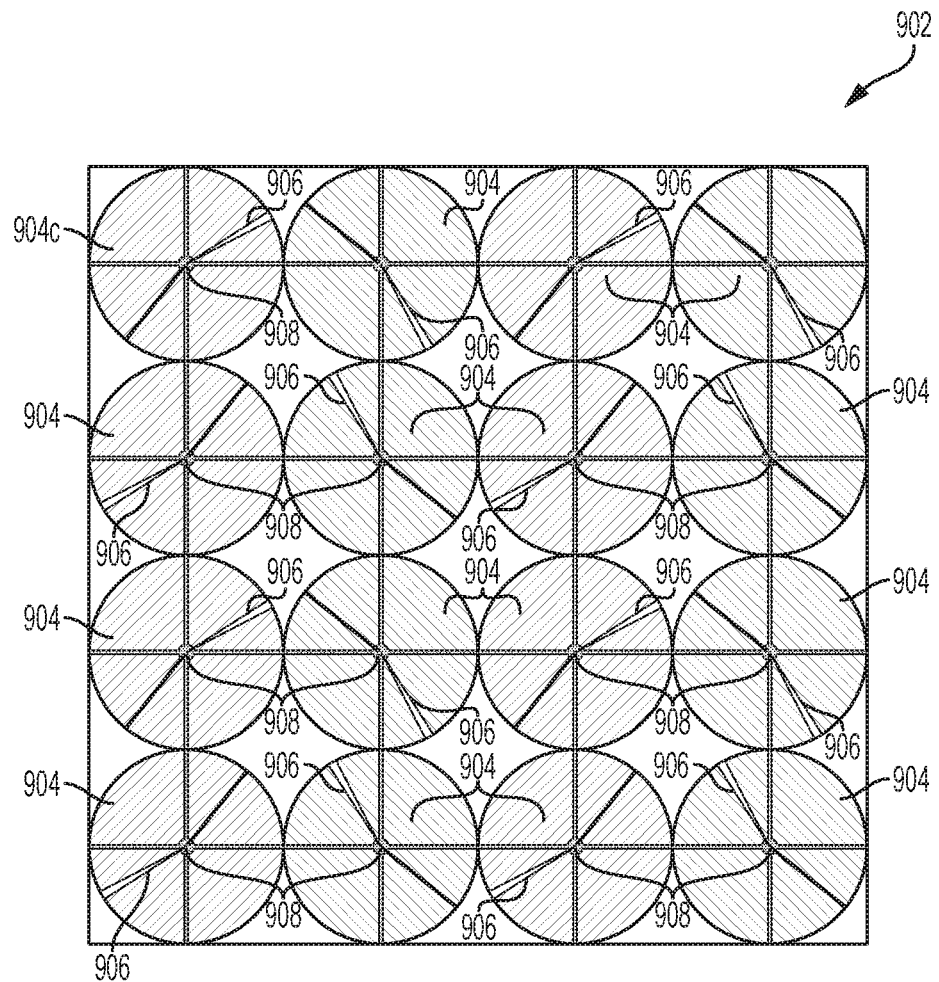
FIG. 9 illustrates an example scaled configuration of the circular grazing system(s) and/or method(s) described herein, in accordance with one or more implementations.

FIG. 9 illustrates an example scaled configuration of the circular grazing system(s) and/or method(s) described herein, in accordance with one or more implementations. Scaled configuration 902 includes multiple circular grazing systems 904 (e.g., sixteen circular grazing systems are illustrated but additional and/or fewer grazing systems are contemplated). By way of non-limiting example, sixteen 160-acre circular grazing fields (2,560 acres total) may produce around 12.5 million birds or 62 million pounds of poultry annually. Comparatively, 52 conventional grow houses (which require more labor, antibiotics, and/or vaccines to produce a lower quality product) would be required to match this output.

Figure 10:
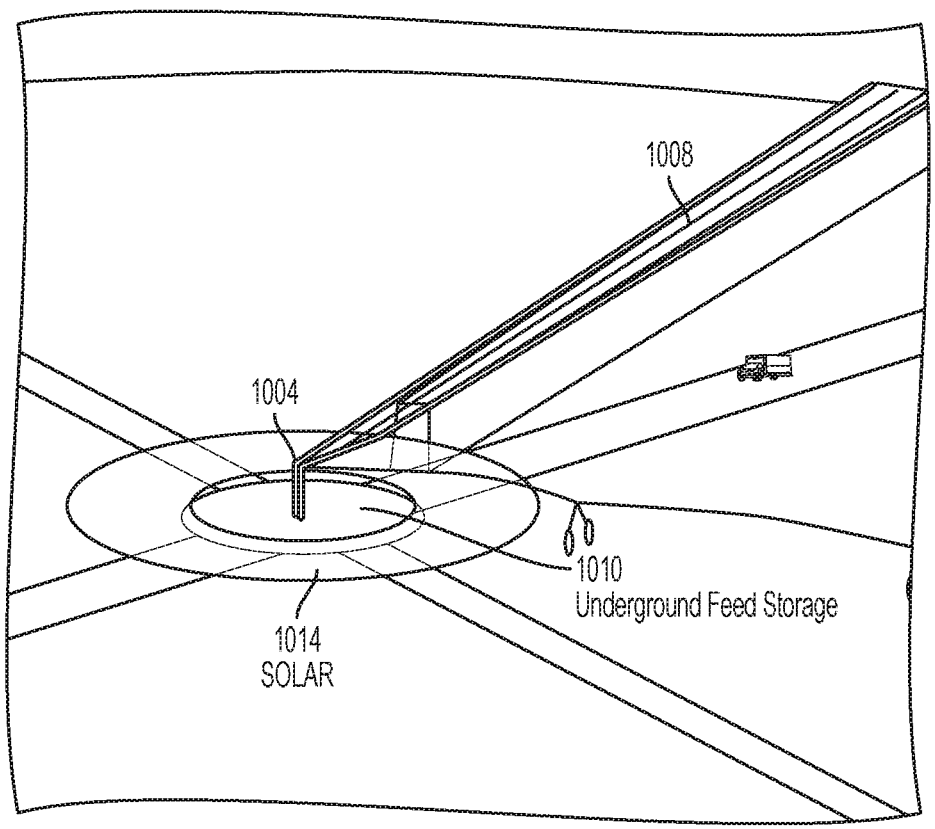
FIG. 10 illustrates an example circular grazing system, in accordance with one or more implementations.

FIG. 10 illustrates an example circular grazing system 1000, in accordance with one or more implementations. Circular grazing system 1000 may include enclosure 1008 extending generally radially from center pivot structure 1004. Enclosure 1008 may be configured to rotate around the center pivot axis of center pivot structure 1004. Circular grazing system 1000 may include feeding system 1010. Feeding system 1010 may be automated. Feeding system 1010 may distribute food within enclosure 1008. Feeding system 1010 may include a feed bin, an auger bit, and/or other components for automatically deploying feed within enclosure 1008. Feeding system 1010 may include a stationary and/or centralized feed hopper and/or underground feed storage unit (e.g., to avoid the necessity to move such a heavy component). Circular crazing system 1000 may include one or more solar panels 1014 for providing power to circular grazing system 1000.

The multiple circular grazing systems 904 include enclosures 906 in which poultry and/or other livestock are contained (e.g., graze within). Individual enclosures 906 may rotate around individual center pivot axis of individual center pivot structures 908. As such, poultry and/or livestock may be moved to fresh pasture daily while reducing the labor required.

In some implementations, the movable poultry and/or livestock enclosure described herein may move linearly and/or laterally instead of rotating around a center pivot axis. In such implementations, the grazing field may be rectangular and/or square and the enclosure may run the length and/or nearly the length of the field and move across the field such that the poultry and/or livestock have access to fresh pasture.

In some implementations, the system may be powered by solar power. Solar panels may be located in the center of the field, or in the unused corner sections of the fields, or elsewhere.

Figure 11A:
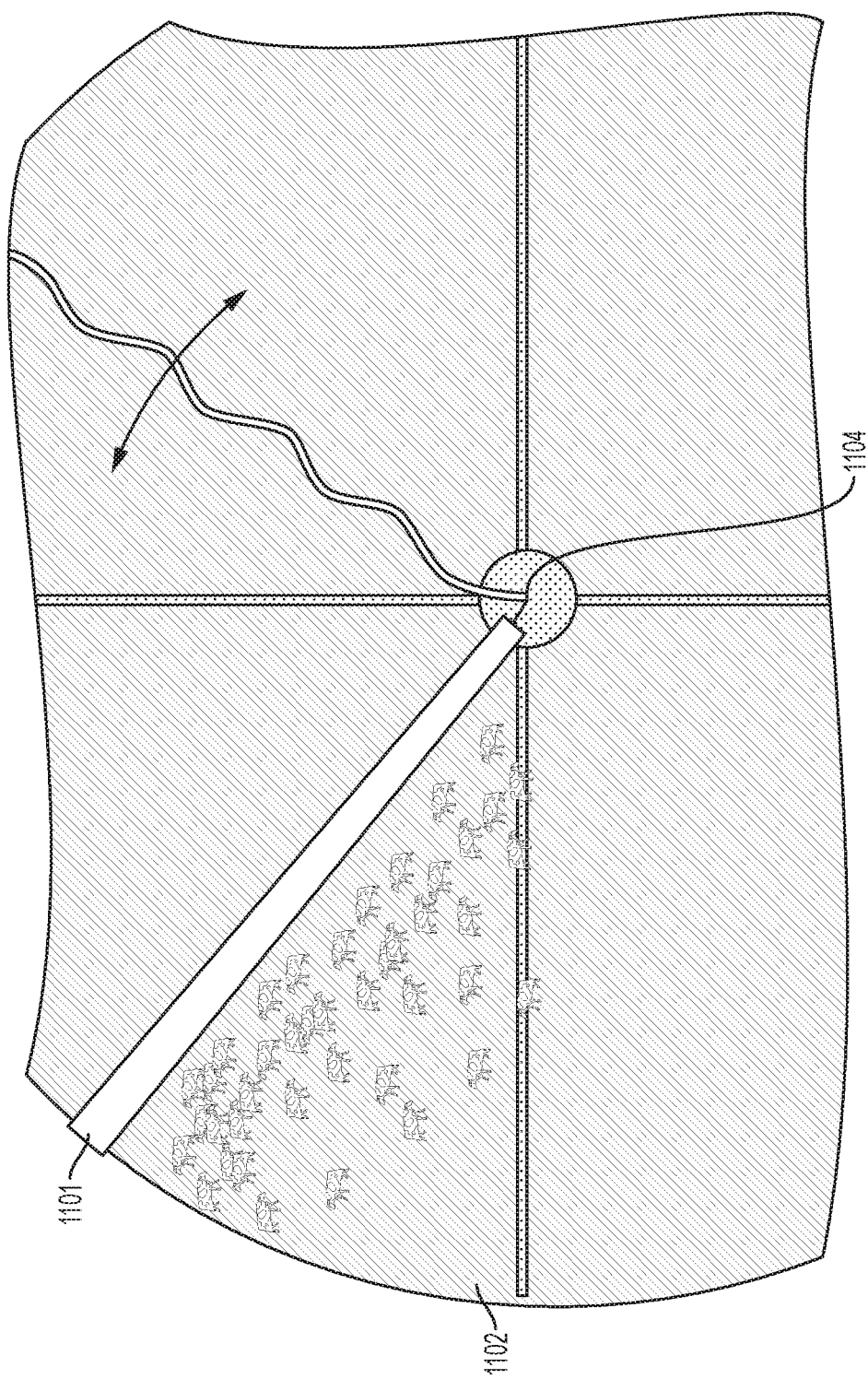
FIG. 11A illustrates a mobile milking station system, in accordance with one or more implementations.

FIG. 11A illustrates mobile milking station system, in accordance with one or more implementations. Mobile milking station system 1101 may be rotably coupled to center pivot structure 1104. Mobile milking station system 1101 may be configured to rotate within field 1102 around center pivot structure 1104. In some implementations, mobile milking station system 1101 may be included in one or more circular grazing systems described herein. Mobile milking station system 1101 may be included in one or more circular grazing systems having an enclosure and/or one or more barriers for containing cows and/or other livestock within the enclosure. Mobile milking station system 1101 may include one or more mobile milking stations.

Figure 11B:
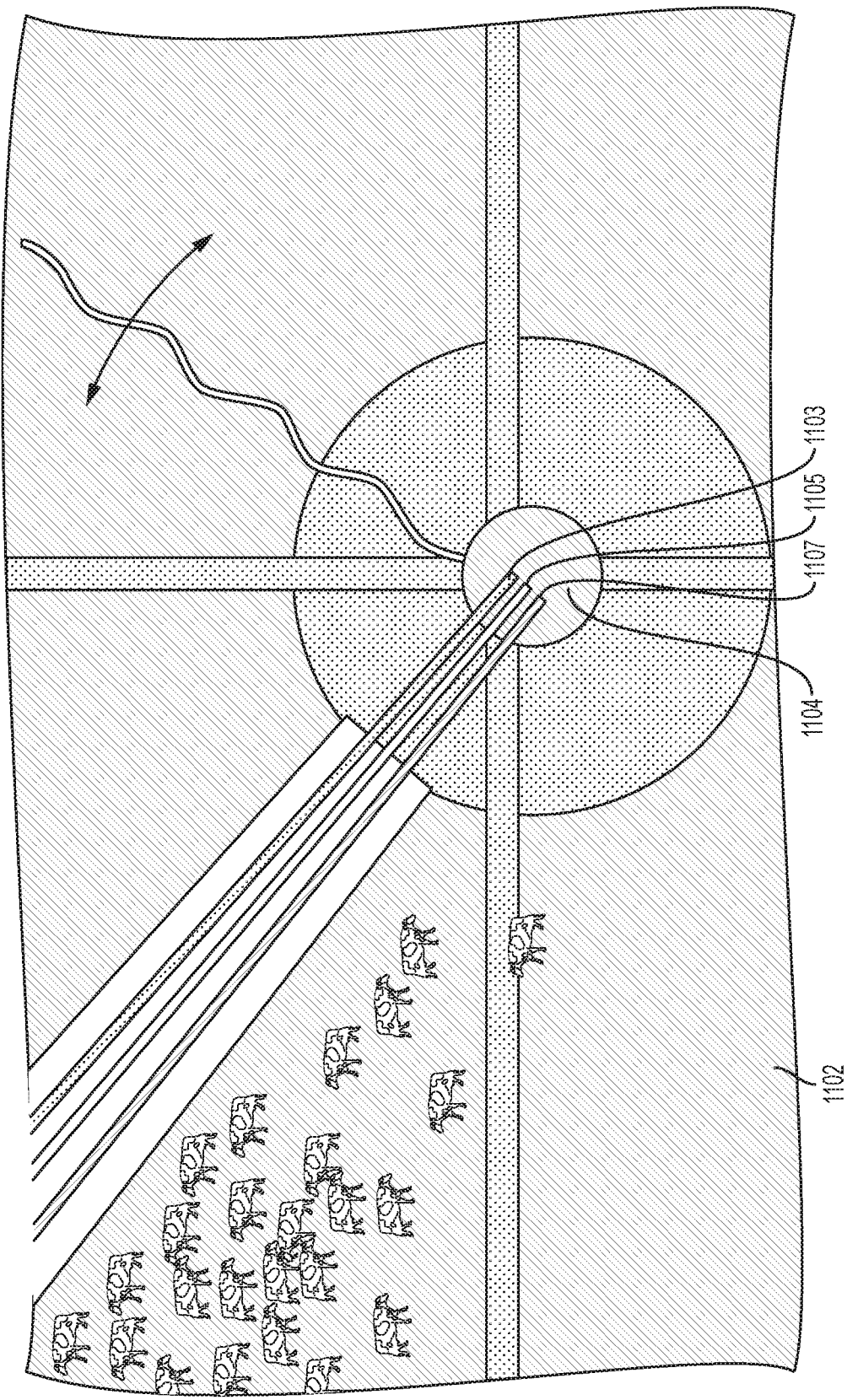
FIG. 11B illustrates a mobile milking station system, in accordance with one or more implementations.

FIG. 11B illustrates mobile milking station system, in accordance with one or more implementations. Mobile milking station system 1101 may include one or more lines coupled to and/or part of the structural supports of mobile milking station system 1101. The one or more lines may include a feed line 1103, a milk line 1105, a water line 1107, and/or other lines. Feed line 1103 may include a line (e.g., pipe, channel, and/or conduit) through which feed travels from a feed storage unit (e.g., an underground feed storage unit). In some implementations, feed line 1103 may include an auger. Milk line 1105 may include a line (e.g., pipe, channel, and/or conduit) through which milk travels to a central milk cooling and/or storage unit (e.g., which, by way of non-limiting example, may be located at the center pivot structure and/or underground beneath the center pivot structure). Water line 1107 may include a line (e.g., pipe, channel, and/or conduit) through which water flows and/or is pumped to water troughs for the cows and/or other livestock. Water line 1107 may carry water from an underground, offsite and/or central water storage unit along mobile milking station system 1101 to the perimeter of field 1102. Water line 1107 may be the water supply for the circular crazing system including mobile milking station system 1101.

Figure 11C:
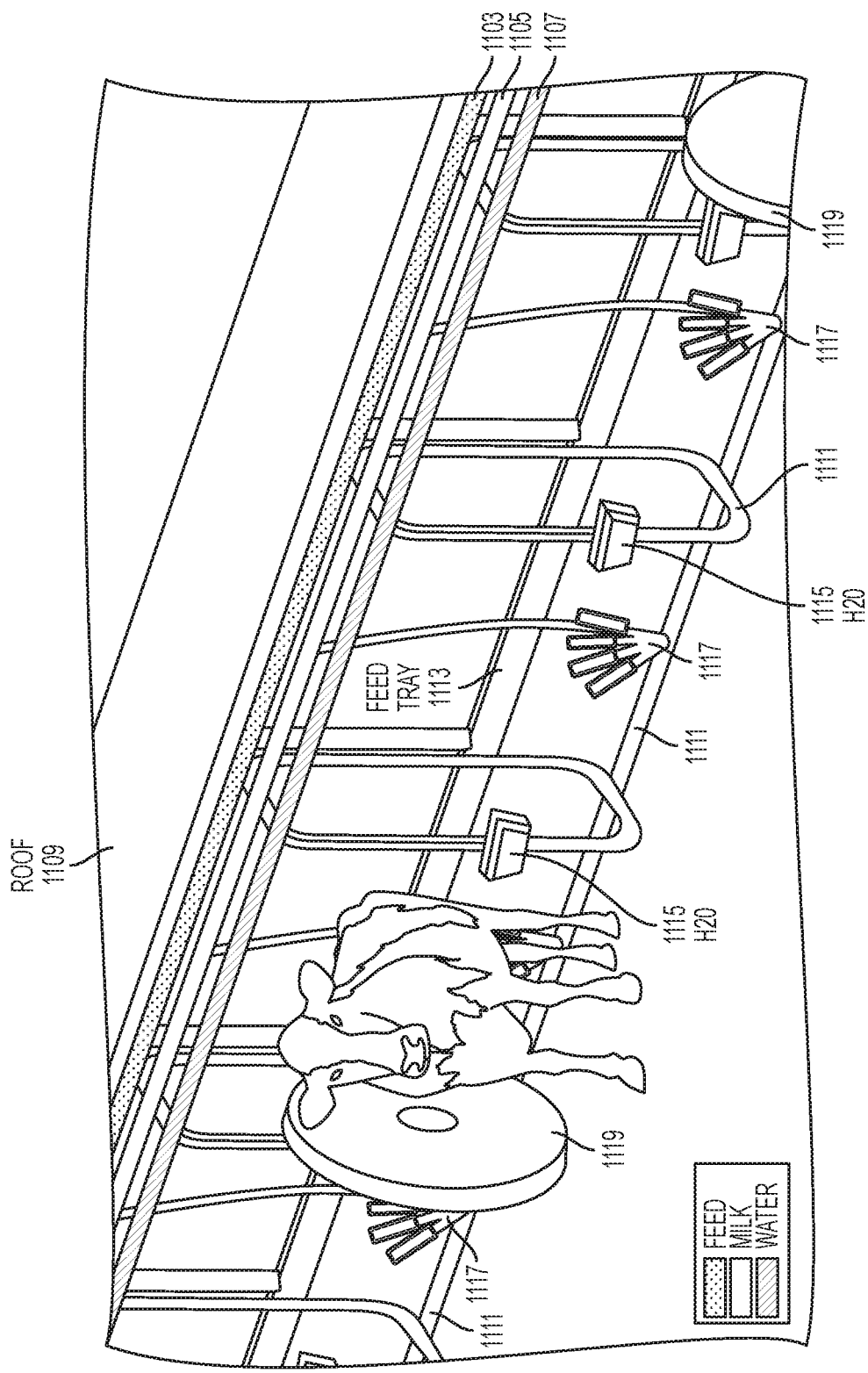
FIG. 11C illustrates a mobile milking station system, in accordance with one or more implementations.

FIG. 11C illustrates mobile milking station system, in accordance with one or more implementations. FIG. 11C illustrates a close-up and/or more detailed view of mobile milking station system 1101. Mobile milking station system 1101 may comprise structural supports 1111. Structural supports 1111 may be part of and/or comprise the chassis on which mobile milking station system 1101 travel. The chassis may include one or more wheels 1119 coupled to one or more structural supports 1111. Feed line 1103 may be coupled to and/or include feed tray 1113. Feed may be deposited into feed tray 1113 via feed line 1103. Cows and/or other livestock may eat from feed tray 1113. In some implementations, feed tray 1113 may extend generally radially from the center pivot structure to and/or near the circumference of the field. In some implementations, one or more individual feed trays 1113 may be located at one or more points along the chassis and/or mobile milking station system 1101.

Water line 1107 may be coupled to and/or include water troughs 1115. Water may be provided to water troughs 1115 via water line 1107. Cows and/or other livestock may drink from water troughs 1115. In some implementations, one or more water troughs 1115 may be located and/or coupled to water line 1107 at one or more points along the mobile milking system 1101 extending generally radially from the center pivot structure to and/or near the circumference of the field. By way of non-limiting example, water troughs 1115 may be coupled to structural supports 1111 at periodic intervals along the length of mobile milking station system 1101. Mobile milking station system 1101 may include one or more milking stations 1117. Milking stations 1117 may be coupled to milk line 1105. Milk line 1105 may carry milk milked via milking stations 1117 to a milk cooling and/or storage unit. Milking stations 1117 may be located at one or more points along the mobile milking system 1101 extending generally radially from the center pivot structure to and/or near the circumference of the field. Milking stations 1117 may be coupled to one or more structural supports 1111 and/or to milk line 1105.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A circular grazing system comprising:
   a center pivot structure installed at a field, wherein the center pivot structure has a center pivot axis and the field includes one or both of a poultry and livestock grazing field;
   an enclosure for containing one or both of poultry and livestock that extends generally radially from the center pivot structure to a circumference of the field, the enclosure comprising two side barriers including a first side barrier and a second side barrier extending generally radially from the center pivot structure to the circumference of the field, and a third barrier coupled to the first side barrier and the second side barrier that connects the two side barriers to form at least part of the enclosure, wherein the enclosure is rotably coupled to the center pivot structure such that the enclosure rotates around the center pivot axis; and a motor causing the enclosure to rotate at least part of the way around the center pivot axis, wherein rotation of the enclosure and initiation of the rotation of the enclosure around the center pivot axis is independent of the poultry and/or livestock foraging.

2. The circular grazing system of claim 1, wherein the enclosure is floorless.

3. The circular grazing system of claim 1, wherein the enclosure includes a chassis with wheels that facilitates movement of the enclosure around the center pivot axis.

4. The circular grazing system of claim 1, wherein there is a clearance between (i) a bottom of at least a portion of at least one of the two side barriers and (ii) the field such that at least a portion of the enclosure may pass over one or both of deceased livestock and poultry lying in the field.

5. The circular grazing system of claim 4, further comprising one or more flaps coupled to the bottom of the at least one of the two side barriers.

6. The circular grazing system of claim 1, wherein a lower portion of at least one of the two side barriers is resiliently flexible so that live animals are maintained in the enclosure, but the lower portion passes over dead animals.

7. The circular grazing system of claim 1, further comprising one or both of a pressurized perforated airline pipe and one or more sound devices coupled to the enclosure and oriented in the direction of the movement of the enclosure.

8. The circular grazing system of claim 7, wherein one or both of: the pressurized perforated airline pipe releases compressed air from airline perforations in the pressurized perforated airline pipe, and the one or more sound devices are automated to induce one or both of poultry and livestock movement responsive to the enclosure rotating around the center pivot axis.

9. The circular grazing system of claim 1, further comprising a feeding system.

10. The circular grazing system of claim 9, wherein the feeding system is automated to distribute one or both of food and milk within the enclosure.

11. The circular grazing system of claim 1, further comprising a water supply.

12. The circular grazing system of claim 11, wherein the water supply is automated to distribute water within the enclosure.

13. The circular grazing system of claim 1, further comprising a mobile milking station system including one or more milking stations that rotate around the field and include one or more conduits that transfer milk radially to one or more central collection vats.

14. The circular grazing system of claim 1, further comprising an irrigation system, wherein the irrigation system includes an arm extending radially from the center pivot structure that is rotably coupled to the center pivot structure, wherein the irrigation system moves one or both of clockwise and counterclockwise around the center pivot axis at a different rate than the enclosure.

15. The circular grazing system of claim 1, further comprising:
one or more processors configured by machine readable instructions to actuate the motor causing the enclosure to rotate at least partially around the center pivot axis.

16. The circular grazing system of claim 15, wherein the one or both of the schedule and rotation rate indicate one or more of: when the enclosure will rotate around the center pivot axis, one or more durations the enclosure will rotate around the center pivot axis, and a speed at which the enclosure will rotate around the center pivot axis.

17. The circular grazing system of claim 1, further comprising one or both of a fourth barrier extending generally radially from the center pivot structure to the circumference of the field and a fifth barrier extending generally radially from the center pivot structure to the circumference of the field, wherein the fourth barrier or the fifth barrier and the first side barrier form a second enclosure for containing one or more of cows, sheep, and goats, and wherein the fourth barrier and the second side barrier form a third enclosure for containing pigs.

18. The circular grazing system of claim 17, wherein the enclosure contains poultry and wherein the enclosure, the second enclosure, and the third enclosure have an order configuration including:
(i) the second enclosure for containing one or more of cows, sheep, and goats in front of the enclosure for containing poultry,
(ii) the enclosure for containing poultry in front of the third enclosure for containing pigs, and
(iii) the third enclosure for containing pigs behind the enclosure for containing poultry,
wherein the front corresponds to the direction in which the enclosure rotates around the center pivot axis.

19. The circular grazing system of claim 1, further comprising one of both of a fourth barrier extending generally radially from the center pivot structure to the circumference of the field and a fifth barrier extending generally radially from the center pivot structure to the circumference of the field, wherein the fourth barrier and the first side barrier of the enclosure or the fifth barrier and the first side barrier form a second enclosure for containing one or more of cows, sheep, and goats; and
wherein the fourth barrier and the second side barrier of the enclosure form a third enclosure for containing pigs.

20. The circular grazing system of claim 1, wherein a proximal end of the enclosure proximal to the center pivot structure has a narrower width than a distal end of the enclosure distal to the center pivot structure.

21. The circular grazing system of claim 1, wherein the enclosure is pie-shaped.

* * * * *